(12) United States Patent
Tachiwa

(10) Patent No.: US 12,160,123 B2
(45) Date of Patent: Dec. 3, 2024

(54) POWER RECEIVING APPARATUS, POWER TRANSMITTING APPARATUS, CONTROL METHOD, AND STORAGE MEDIUM FOR MULTIPLE POWER LOSS MEASUREMENT BASED FOREIGN OBJECT DETECTION

(71) Applicant: CANON KABUSHIKI KAISHA, Tokyo (JP)

(72) Inventor: Wataru Tachiwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 17/678,919

(22) Filed: Feb. 23, 2022

(65) Prior Publication Data

US 2022/0181917 A1  Jun. 9, 2022

Related U.S. Application Data

(63) Continuation of application No. PCT/JP2020/026743, filed on Jul. 8, 2020.

(30) Foreign Application Priority Data

Aug. 29, 2019 (JP) ................................. 2019-156802

(51) Int. Cl.
*H02J 50/80* (2016.01)
*H02J 7/00* (2006.01)
*H02J 50/12* (2016.01)
*H02J 50/60* (2016.01)

(52) U.S. Cl.
CPC ........ *H02J 50/80* (2016.02); *H02J 7/007188* (2020.01); *H02J 50/12* (2016.02); *H02J 50/60* (2016.02)

(58) Field of Classification Search
CPC .................................. H02J 50/60; H02J 50/80
See application file for complete search history.

(56) References Cited

U.S. PATENT DOCUMENTS

| | | | |
|---|---|---|---|
| 2014/0015334 A1* | 1/2014 | Jung ....................... | H02J 50/10 307/104 |
| 2015/0097442 A1* | 4/2015 | Muurinen ............ | H04B 5/0037 307/104 |
| 2015/0263532 A1* | 9/2015 | Van Wageningen .... | H02J 50/80 307/104 |

(Continued)

FOREIGN PATENT DOCUMENTS

| | | |
|---|---|---|
| JP | 2017-070074 A | 4/2017 |
| JP | 2017-537598 A | 12/2017 |

(Continued)

*Primary Examiner* — Rexford N Barnie
*Assistant Examiner* — David A Shiao
(74) *Attorney, Agent, or Firm* — Canon U.S.A., Inc. IP Division

(57) ABSTRACT

A power receiving apparatus 101 transmits information representing three or more received powers used in calculating a parameter used in a detection processing by a transmitting apparatus 102. At that time, a relationship P1<P2<P3 is satisfied, where P1 is a first received power which information transmitted an n-th time represents (n is an integer of one or greater), P2 is a second received power which information transmitted an n+1-th time represents, and P3 is a third received power which information transmitted an n+2-th time represents.

10 Claims, 10 Drawing Sheets

(56) References Cited

U.S. PATENT DOCUMENTS

| | | | |
|---|---|---|---|
| 2016/0149440 A1* | 5/2016 | Staring | G01V 3/10 |
| | | | 307/104 |
| 2017/0018977 A1* | 1/2017 | Van Wageningen | H02J 50/80 |
| 2017/0229926 A1* | 8/2017 | Oettinger | H02J 50/80 |
| 2020/0366137 A1* | 11/2020 | Park | H02J 50/80 |
| 2021/0036555 A1* | 2/2021 | Park | H04L 9/40 |
| 2021/0066973 A1* | 3/2021 | Park | H02J 50/80 |
| 2021/0184513 A1* | 6/2021 | Park | H02J 50/60 |
| 2021/0257862 A1* | 8/2021 | Muratov | H02J 50/60 |
| 2021/0257864 A1* | 8/2021 | Stingu | H02J 50/80 |

FOREIGN PATENT DOCUMENTS

| | | |
|---|---|---|
| JP | 2019-041541 A | 3/2019 |
| WO | 2016/091764 A1 | 6/2016 |
| WO | 2019139326 A1 | 7/2019 |

\* cited by examiner

FIG. 8

| WHAT NUMBER ITEM? | RECEIVED POWER [WATT] | POWER LOSS [WATT] |
|---|---|---|
| 1 | 0.4 | 0.1 |
| 2 | 1.0 | 0.3 |
| 3 | 1.5 | 0.4 |
| ⋮ | ⋮ | ⋮ |

801 — row 1
802 — row 2
803 — row 3

POWER RECEIVING APPARATUS, POWER TRANSMITTING APPARATUS, CONTROL METHOD, AND STORAGE MEDIUM FOR MULTIPLE POWER LOSS MEASUREMENT BASED FOREIGN OBJECT DETECTION

CROSS-REFERENCE TO RELATED APPLICATIONS

This application is a Continuation of International Patent Application No. PCT/JP2020/026743, filed Jul. 8, 2020, which claims the benefit of Japanese Patent Application No. 2019-156802, filed Aug. 29, 2019, both of which are hereby incorporated by reference herein in their entirety.

BACKGROUND

Field

The present disclosure relates to a power receiving apparatus, a power transmitting apparatus, a control method, and a program relating to wireless power transmission.

Background Art

Development of technology relating to wireless power transmission systems such as wireless charging systems has been carried out extensively in recent years. In Japanese Patent Laid-Open No. 2017-070074, a power transmitting apparatus and a power receiving apparatus are described which are compliant with a standard (hereinafter, referred to as the WPC standard) developed by the Wireless Power Consortium (WPC), a group for promoting wireless charging standardization. Also, in Japanese Patent Laid-Open No. 2017-070074, a calibration process is defined that increases the accuracy of the detection of an electrically conductive object such as a metal piece using the WPC standard.

In the calibration process, a transmitted power of a power transmitting apparatus and the corresponding received power of a power receiving apparatus are obtained when the power receiving apparatus is in two different states. Then, using these two sets of transmitted power and received power, a parameter for calibrating the received power or the transmitted power when power is actually transmitted wirelessly is calculated. This parameter is used in the processing for detecting an object other than the power receiving apparatus. In other words, for example, with respect to the received power when power is wirelessly transmitted by the power transmitting apparatus, the received power calibrated using the parameter can be estimated, and a power loss, which is the difference between the actual transmitted power of the power transmitting apparatus and the estimated received power can be calculated. Then, in a case where the power loss is greater than a predetermined value, it can be determined that there is a power loss caused by an object other than the power receiving apparatus.

However, because only two sets of the transmitted power and the received power set are used in calculating the parameter used in the processing to detect an object other than the power receiving apparatus, the detection accuracy may be decreased.

Thus, in order to increase the detection accuracy, three or more sets of transmitted power and received power may be conceivably used to calculate the parameter. However, a method for efficiently obtaining information representing the received power in the power transmitting apparatus in this case is not presented.

CITATION LIST

Patent Literature

PTL 1: Japanese Patent Laid-Open No. 2017-070074

SUMMARY

In light of the problems described above, in the present disclosure, technology is provided for causing a power transmitting apparatus to efficiently obtaining information representing a received power, with the power transmitting apparatus calculating a parameter for processing to detect an object other than a power receiving apparatus using three or more sets of a transmitted power and a received power.

According to one aspect of the present disclosure, there is provided a power receiving apparatus comprising: a power receiving unit configured to wirelessly receive power from a power transmitting apparatus that executes detection processing to detect an object different from the power receiving apparatus when power is wirelessly transmitted; and a transmission unit configured to transmit information representing three or more received powers used in calculating a parameter used in the detection processing, wherein a relationship P1<P2<P3 is satisfied, where P1 is a first received power represented by information transmitted an n-th time by the transmission unit, where n is an integer of one or greater, P2 is a second received power represented by information transmitted an n+1-th time by the transmission unit, and P3 is a third received power represented by information transmitted an n+2-th time by the transmission unit.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 8 is a diagram showing results of calibration processing according to the present embodiment.

DESCRIPTION OF THE EMBODIMENTS

Embodiments of the present disclosure are described below with reference to the drawings. Note that the embodiments described below are merely examples for describing the technical concept of the present disclosure, and the present disclosure is not limited by the configurations and methods described in the embodiments.

EMBODIMENTS

System Configuration

Figure 1:
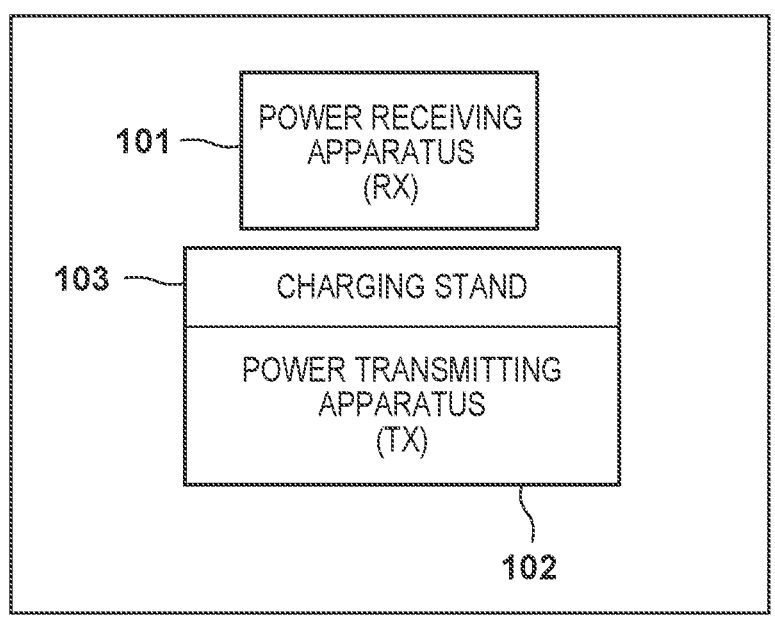
FIG. 1 is a diagram illustrating the configuration of a wireless charging system.

FIG. 1 is a diagram illustrating an example configuration of a wireless charging system (wireless power transmission system) according to the present embodiment. The system includes a power receiving apparatus 101 and a power transmitting apparatus 102. Hereinafter, the power receiving apparatus will be referred to as RX, and the power transmitting apparatus will be referred to as TX. TX 102 is an electronic apparatus that wirelessly transmits power to the RX 101 placed in a charging stand 103. The RX 101 is an electronic apparatus with a built-in battery that is charged by receiving power transmitted wirelessly from the TX 102. In the example described below, the RX 101 is placed in the charging stand 103. However, for the TX 102 to transmit power to the RX 101, as long as the RX 101 is within the power-transmittal range of the TX 102, the RX 101 may not be placed on the charging stand 103.

Note that the RX 101 and the TX 102 may have a function of executing an application other than wireless charging. An example of the RX 101 is a smartphone, and an example of the TX 102 is an accessory device for charging the smartphone. The RX 101 and the TX 102 may be storage devices, such as a hard disk or a memory device, or may be information processing devices such as a personal computer (PC). Also, the RX 101 and the TX 102, for example, may be image input devices, such as an image capture apparatus (a camera, a video camera, and the like) or a scanner, or may be an image output device, such as a printer, copying machine, or a projector. Also, the TX 102 may be a smartphone. In this case, the RX 101 may be another smartphone or a wireless earphone. Also, the RX 101 may be a vehicle. Also, the TX 102 may be a charger placed on the console or the like inside the vehicle.

Also, in the present embodiment, one RX 101 and one TX 102 are illustrated. However, other embodiments may have a configuration in which a plurality of RX 101 are charged by a single TX 102 or different individual TXs 102.

In the present system, wireless power transmission is performed using an electromagnetic induction method for wireless charging on the basis of the WPC standard. In other words, for the RX 101 and the TX 102, wireless power transmission is performed between a power receiving coil of the RX 101 and a power transmitting coil of the TX 102 to perform a wireless charge based on the WPC standard. Note that the wireless power transmission system (non-contact power transmission method) used in the present system is not limited to that defined in the WPC standard, and other systems may be used, such as other electromagnetic induction systems, magnetic field resonance systems, electric field resonance systems, microwave systems, lasers, and the like. Also, in the present embodiment, the wireless charging uses wireless power transmission. However, wireless power transmission may be used for a different purpose other than for wireless charging.

In the WPC standard, the magnitude of the power guaranteed when power is received by the RX 101 from the TX 102 is defined as a value called Guaranteed Power (hereinafter, referred to as GP). GP represents the power value of the guaranteed output to the load (for example, a circuit for charging) of the RX 101 even when the power transmitting efficiency between the power receiving coil and the power transmitting coil decreases due to the positional relationship between the RX 101 and the TX 102 changing, for example. For example, in a case where the GP is 5 watts, even when the positional relationship between the power receiving coil and the power transmitting coil changes and the power transmitting efficiency is reduced, the TX 102 controls the power transmission in a manner such that 5 watts is output to the load in the RX 101.

The RX 101 and the TX 102 according to the present embodiment communicate to perform power transmission and reception control based on the WPC standard. The WPC standard defines a plurality of phases including a Power Transfer phase in which power is transmitted and phases before actual power transmission. In these phases, communication is executed to control the transmitting and receiving of power as necessary. Pre-power transmission phases include a Selection phase, a Ping phase, an Identification and Configuration phase, a Negotiation phase, and a Calibration phase. Note that hereinafter, the Identification and Configuration phase will be referred to as the I&C phase.

In the Selection phase, the TX 102 intermittently transmits an Analog Ping and detects if an object is placed on the charging stand 103 (for example, if the RX 101, conductor piece, or the like is placed on the charging stand 103). In other words, an analog pin is a detection signal for detecting whether an object exists. The TX 102 transmits an Analog Ping by applying a voltage or a current to the power transmitting coil. Also, depending on whether an object is placed on the charging stand 103 or there is no object placed, a change occurs in the voltage or current applied to the power transmitting coil. Then, the TX 102 detects at least a voltage value or a current value of a power transmitting coil when the Analog Ping was transmitted, determines that an object exists in the case in which the voltage value is less than a threshold or the current value is greater than a threshold, and transitions to the Ping phase.

In the Ping phase, the TX 102 transmits a Digital Ping with more power than the analog ping. The amount of power of the Digital Ping is sufficient enough to activate a control unit of the RX 101 placed on the charging stand 103. The RX 101 notifies the TX 102 of the amount of the received voltage. In other words, the RX 101 transmits a Signal Strength Packet (hereinafter, referred to as an SS packet) to the TX 102. In this way, by receiving a reply from the RX 101 that received the Digital Ping, the TX 102 recognizes that the object detected in the Selection phase is the RX 101. When the TX 102 receives a notification of the received voltage value, the process transitions to the I&C phase.

In the I&C phase, the TX 102 identifies the RX 101 and acquires device configuration information (capability information) from the RX 101. Accordingly, the RX 101 transmits an ID Packet and a Configuration Packet to the TX 102. The ID Packet includes the identification information of the RX 101, and the Configuration Packet includes the device configuration information (capability information) of the RX 101. The TX 102 having received the ID Packet and the Configuration Packet replies with an acknowledge (ACK). Then, the I&C phase ends.

In the Negotiation phase, the GP value is determined on the basis of the GP value requested by the RX 101, the power transmission capability of the TX 102, and the like. Also, the RX 101 obtains the capability information of the TX 102.

In the Calibration phase, the RX 101 uses a Received Power Packet to notify the TX 102 of the received power. Accordingly, the TX 102 obtains the transmitted power corresponding to the received power and associates together and stores the transmitted power and the received power. Then, the TX 102 calculates the parameter for foreign object detection processing on the basis of at least two sets of a received power and a transmitted power and stores this. In the present embodiment, also in the Power Transfer phase described below, the parameter for foreign object detection processing is calculated and stored.

Next, the calibration process will be described. In the calibration process, the transmitted power of the TX 102 and the received power of the RX 101 are obtained when the RX 101 is in two different states. Then, using these two sets of a transmitted power and a received power, a parameter for calibrating the received power or the transmitted power when power is actually transmitted wirelessly is calculated. For example, in a case of calibrating the received power, a calibrated received power $P_{cal}$ is represented by Formula 1 below.

$$P_{cal}=a \cdot P_{received}+b \qquad \text{Formula 1}$$

Herein, $P_{received}$ is the received power reported by the TX 102 in the Power Transfer phase, and a and b are parameters. The two parameters are represented by Formula 2 and Formula 3 below.

$$a=(TP2-TP1)/(RP2-RP1) \qquad \text{Formula 2}$$

$$b=(RP2 \cdot TP1-TP2 \cdot RP1)/(RP2-RP1) \qquad \text{Formula 3}$$

Herein, RP1 and RP2 are two received powers reported by the RX 101 in the Calibration phase. Specifically, RP1 is a received power obtained by the TX 102 in a first time of calibration processing, and RP2 is a received power obtained by the TX 102 in a second time of calibration processing. Also, TP1 and TP2 are the transmitted powers corresponding RP1 and RP2. RP2 is greater than RP1, and TP2 is greater than TP1.

A power loss PL is represented by Formula 4 below.

$$PL=P_{transmitted}-P_{cal} \qquad \text{Formula 4}$$

Herein, $P_{transmitted}$ is the transmitted power corresponding to the received power reported by the TX 102 in the Power Transfer phase.

Whether or not there is a foreign object is detected by comparing the power loss and a predetermined threshold. In other words, in a case where the power loss represented by Formula 4 is greater than the predetermined threshold, the TX 102 determines that there is a power loss caused by a foreign object, i.e., an object different from the power receiving apparatus, and determines that there is a foreign object.

The target of calibration may not be the received power and may be the transmitted power or the power loss. Also, the method of calibration may use estimation using linear interpolation or may use nonlinear estimation using a power series, for example. A case where the power loss is calibrated is described below. In this case, the power loss, which is the difference between the received power of the RX 101 and the corresponding transmitted power of the TX 102, is calculated, and the received power and the power loss are associated together and stored. Specifically, the received power and the power loss when the load of the RX 101 is in two different states are stored, and, from the two sets of a received power and a power loss, an expected value of the power loss at a discretionary received power is obtained via linear interpolation. However, to calculate the power loss, the transmitted power of the TX 102 corresponding to the received power of the RX 101 is also obtained.

In the foreign object detection processing, whether or not the difference between the expected value of the power loss and the actual power loss is greater than a predetermined value is determined, and in a case where the difference is greater, a foreign object is determined to exist. In other words, herein, the expected value of the power loss is the calibrated power loss.

A calibrated power loss PLcal is represented by Formulas 5 and 6 below.

$$PLcal=c \cdot (P_{received}-RP1)+PL1 \qquad \text{Formula 5}$$

$$c=(PL2-PL1)/(RP2-RP1) \qquad \text{Formula 6}$$

Herein, PL1 and PL2 are power losses corresponding the two received powers RP1 and RP2 reported by the RX 101 in the Calibration phase described above. c corresponds to a parameter for executing foreign object detection processing.

Figure 9A:
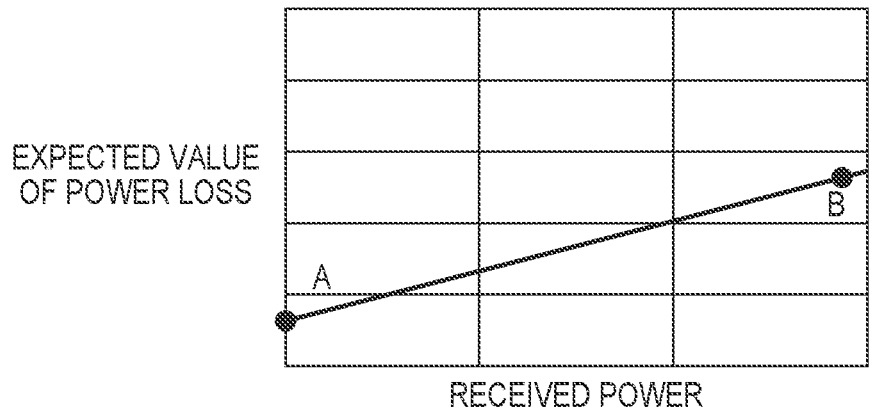
FIG. 9A is a diagram for describing the difference between an embodiment and known foreign object detection processing.

In a known calibration process, calibration processing is executed in two states, a state in which the received power is not supplied to the battery of the RX 101 and a state in which maximum power to supplied to the battery of the RX 101. The expected value of the power loss represented by linear interpolation in this case is illustrated in FIG. 9A. In FIG. 9A, the power loss corresponding to the received power of the first time reported by the RX 101 is represented by point A, and the power loss corresponding to the received power of the second time reported by the RX 101 is represented by point B. Because linear interpolation is performed on the basis of these two points, the expected value of the power loss increases in a linear manner when the received power increases.

However, in reality, when the received power increases, the power loss does not always increase in a linear manner. In a case where the power loss does not increase in a linear manner, the determination result to determine whether or not a foreign object exists using the expected value of the power loss calculated by linear interpolation on the basis of the two points may be erroneous. Thus, in the present embodiment, the parameter for executing foreign object detection processing uses three or more sets of the received power and the corresponding power loss. In this manner, the determination accuracy of whether or not a foreign object exists, i.e., foreign object detection accuracy, can be improved.

Figure 9B:
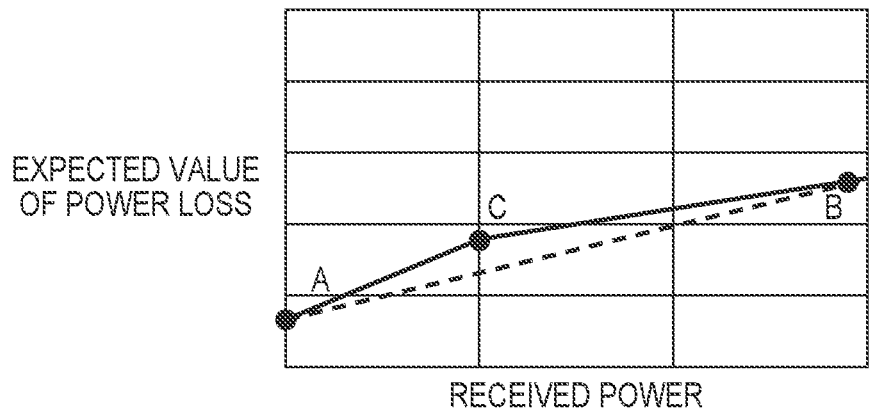
FIG. 9B is a diagram for describing the difference between an embodiment and known foreign object detection processing.

In FIG. 9B, point A, point B, and point C represent three sets of the received power and the power loss used in calculating the parameter for foreign object detection processing. The solid line joining point A and point C is a line representing the expected value of the power loss in a case where the set of the received power and the power loss represented by point A is (RP1, PL1) and the set of the received power and the power loss represented by point C is (RP2, PL2). Also, the solid line joining point C and point B is a line representing the expected value of the power loss in a case where the set of the received power and the power loss represented by point C is (RP1, PL1) and the set of the received power and the power loss represented by point B is (RP2, PL2). Also, the dashed line illustrated in FIG. 9B represents the solid line in FIG. 9A. Accordingly, by using three or more sets of the received power and the power loss corresponding to the received power, the amount of information actually obtained from the RX 101 is increased, and, using the larger amount of information, a more appropriate expected value can be calculated for calculating the expected value of the power loss. Using a more appropriate expected value allows the foreign object detection accuracy to be improved. Note that a configuration may be used in which three points are used and the expected value of the power loss is calculated via a nonlinear function.

Figure 9C:
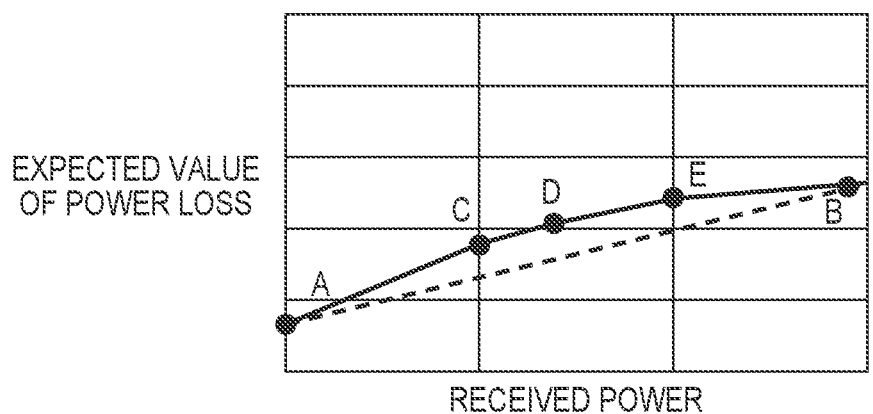
FIG. 9C is a diagram for describing the difference between an embodiment and known foreign object detection processing.

FIG. 9C illustrates an example in which, in addition to point A, point B, and point C, the two points point D and point E are used in calculating the parameter for foreign object detection processing. In this case, more information is actually obtained from the RX 101 than in the case illustrated in FIG. 9B, allowing a more appropriate expected value to be calculated. In this manner, by increasing the number of times that the received power used in calculating the parameter for foreign object detection processing is obtained, the foreign object detection accuracy can be improved.

In the present embodiment, by setting the size of the received power and the order in which the received power is obtained, the received power used in calculating the parameter for foreign object detection processing can be more efficiently obtained. In other words, regarding point A, point B, and point C as represented in FIG. 9B, the received power is obtained in the order of point A, point C, and point B. If the received power is obtained in the order point A, point B, and point C, the received power needs to be raised from point A to point B and then lowered from point B to point C. Alternatively, as in the present embodiment, in a case where the received power is obtained in the order of point A, point C, and point B, the received power only needs to be raised. Accordingly, a process for lowering the received power is not needed after the received power is raised, and three or more sets of a transmitted power and a received power can be efficiently obtained. This is because the RX 101 controls, in accordance with the charging characteristics of a battery 202, the received power (transmitted power) to be low when charging is started and gradually increase as time passes to reach a maximum value. Specifically, with the operation of the RX 101 in accordance with the charging characteristics, because information representing the received power used in calculating the parameter is transmitted to the TX 102, the TX 102 is caused to obtain this information in an efficient manner.

Note that point A, point B, and point C are not limited to being information obtained in the first, second, and third time of calibration processing. In other words, in the present embodiment, regarding the received power obtained by the TX 102 and the obtaining order, as long as Formula 7 below is satisfied, three or more sets of a transmitted power and a received power can be efficiently obtained.

$$P1 < P2 < P3 \qquad \text{Formula 7}$$

Herein, P1, P2, and P3 are received powers used in calculating the parameter for the foreign object detection processing obtained for the n-th time, n+1-th time, and the n+2-th time. Note that n is an integer of 1 or more.

Note that in a case where the received power used in calculating the parameter for the foreign object detection processing is obtained four or more times, the received power of the n+3-th time should be greater than P2. In other words, the received power of the n+3-th time may be greater than P3 or may be less than P3. With this configuration as well, the received power or the transmitted power used in calculating the parameter for foreign object detection processing can be efficiently obtained. Also, in the case of n=2, when the received power used in calculating the parameter for foreign object detection processing obtained the first time is less than P1, four or more received powers or transmitted powers used in calculating the parameter for foreign object detection processing can be efficiently obtained. However, even in a case where the received power of the first time is greater than P1, three received powers used in calculating the parameter for foreign object detection processing obtained at least in the second to fourth times can be efficiently obtained. Note that a similar effect can be obtained when n is three or more. Also, by the received power used in calculating the parameter for foreign object detection processing being obtained in order from the smallest received power to the largest received power, the received power can be more efficiently obtained.

Furthermore, in a case where point A, point C, and point B are information obtained in the first, second, and third calibration processing, in other words, in the case of n=1, the time before starting foreign object detection processing can be reduced. In a case where the received power is raised from point A to point B, it is necessary to raise the power to point B and obtain the received power at point B to start foreign object detection processing. However, according to the present embodiment, by raising the received power from point A to point C, obtaining the received power, and calculating the parameter, foreign object detection processing can be executed without raising the received power to point B. In other words, foreign object detection processing can be started earlier by the amount of time corresponding to the amount of time used to raise the received power from point C to point B. Furthermore, foreign object detection processing can be executed in the time used to raise the received power from point C to point B. Also, before obtaining the received power of the third time, from among the three or more received powers used in calculating the parameter for foreign object detection processing, foreign object detection processing using the parameter calculated beforehand can be executed.

In the Power Transfer phase, control is performed to start power transmission, continue power transmission, stop power transmission due to detection of a foreign object or a full charge, and the like. In the Power Transfer phase, obtaining the received power used in calculating the parameter for foreign object detection processing may be performed from the third time onward. In other words, from among the three or more received powers used in calculating the parameter for foreign object detection processing, the received powers of the first and second time may be obtained in the Calibration phase. Then, from among the three or more received powers used in calculating the parameter for foreign object detection processing, the received powers of the third time and onward may be obtained in the Power Transfer phase. With this configuration, the amount of time used in the Calibration phase is reduced, the Power Transfer phase can be transitioned to earlier, and the charging of the battery of the RX 101 can be started earlier, for example. Also, as described above, by using the parameter calculated from the two received powers obtained in the Calibration phase and the corresponding transmitted power or the power loss, foreign object detection processing can be started in the Power Transfer phase. Thereafter, the received power is obtained for the third time onward and the parameter for foreign object detection processing is calculated, allowing the detection accuracy of foreign object detection processing to be improved.

The TX 102 and the RX 101 perform communication, for controlling the transmitting and receiving of power therebetween, that superimposes a signal on the transmitted power using the same antenna (coil) used for the wireless power transmission on the basis of the WPC standard. Also, the TX 102 and the RX 101 may perform communication for power transmission and reception control using a different antenna (coil) to that used for wireless power transmission. An example of communication using a different antenna to that used for wireless power transmission is a communication system compliant with the Bluetooth (registered trademark) Low Energy standard. Also, communication may be performed via IEEE 802.11 standard series wireless LAN (for example, Wi-Fi (registered trademark), ZigBee, near-field communication (NFC), or another similar communication method. Communication using a different antenna (coil) to that used for wireless power transmission may be performed on a different frequency to that used for wireless power transmission.

Apparatus Configuration

Next, the configuration of the power receiving apparatus 101 (RX 101) and the power transmitting apparatus 102 (TX 102) according to the present embodiment will be described. Note that the configuration described below is simply one example, and a part (or all parts) of the configuration described below may be replaced by other configurations with similar functions, may be omitted, or other configurations may be added in addition to the configurations described below. Furthermore, one block described in the description below may be one block divided into a plurality of blocks or may be a plurality of blocks merged as a single block.

Figure 2:
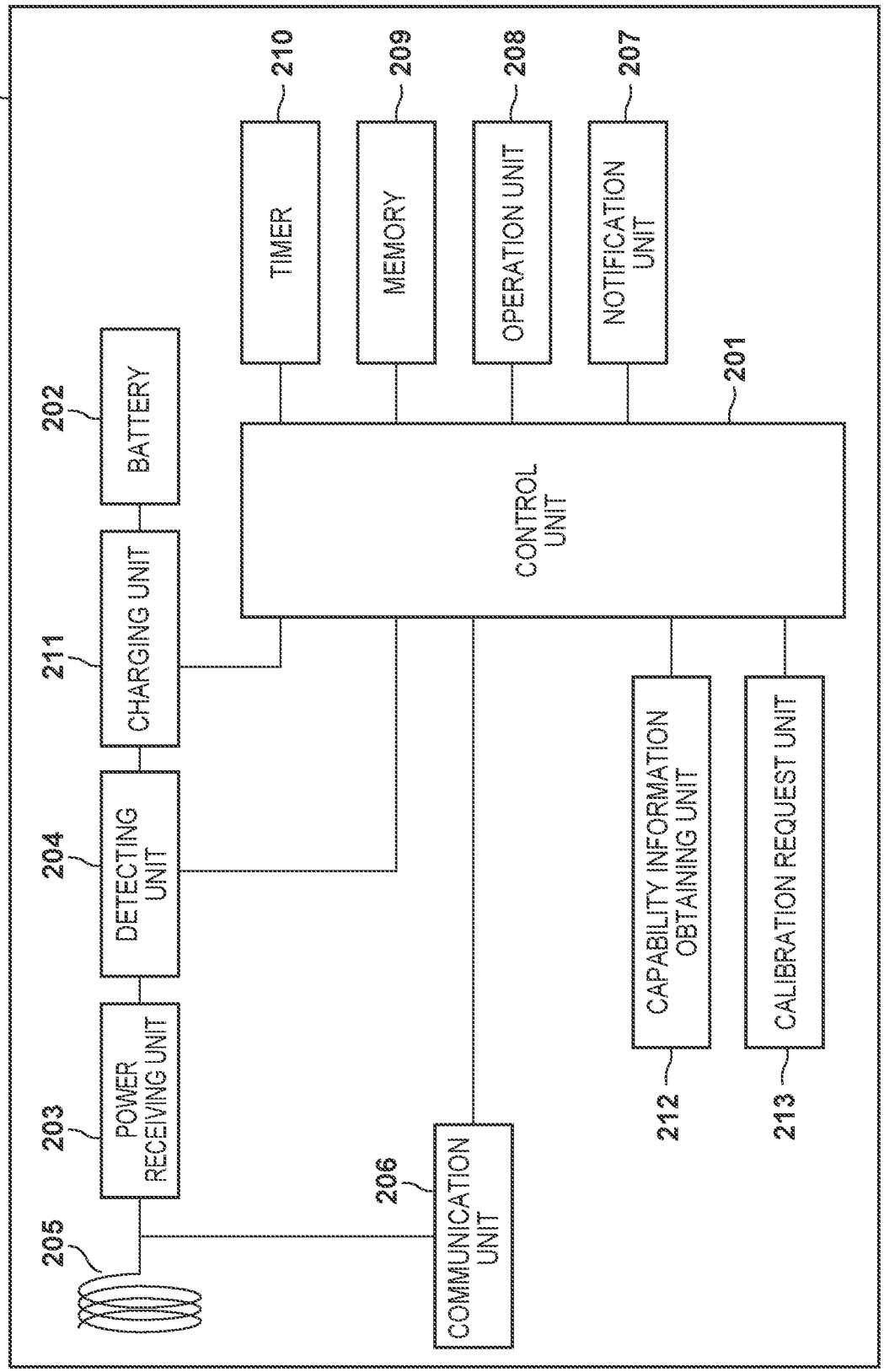
FIG. 2 is a diagram illustrating an example configuration of a power receiving apparatus according to an embodiment.

FIG. 2 is a diagram illustrating the configuration of the RX 101 according to the present embodiment. The RX 101 includes a control unit 201, the battery 202, a power receiving unit 203, a detecting unit 204, a power receiving coil 205, a communication unit 206, a notification unit 207, an operation unit 208, memory 209, a timer 210, a charging unit 211, a capability information obtaining unit 212, and a calibration request unit 213.

The control unit 201, for example, controls the entire RX 101 by executing a control program stored in the memory 209. In other words, the control unit 201 controls the functional units illustrated in FIG. 2. Also, the control unit 201 executes control relating to power reception control of the RX 101. Furthermore, the control unit 201 may execute control for executing an application other than wireless power transmission. The control unit 201, for example, includes one or more processors, such as a central processing unit (CPU), a micro processing unit (MPU), or the like. Note that the control unit 201 may be constituted by hardware dedicated to specific processing, such as an application specific integrated circuit (ASIC), or the like. Also, the control unit 201 may include an array circuit such as a field programmable gate array (FPGA) compiled so as to execute predetermined processing. The control unit 201 stores information to be stored during the execution of various types of processing in the memory 209. Also, the control unit 201 is capable of measuring time using the timer 210.

The battery 202 supplies the power to the entire RX 101 required for the control, power reception, and communication of the units of the RX 101 by the control unit 201. Also, the battery 202 stores the power received via the power receiving coil 205.

The power receiving coil 205 generates power via electromagnetic induction utilizing electromagnetic waves radiated from the power transmitting coil of the TX 102, and the power receiving unit 203 obtains the power generated at the power receiving coil 205. The power receiving unit 203 obtains alternating current power generated via electromagnetic induction at the power receiving coil 205. Also, the power receiving unit 203 converts the alternating current power to direct current or alternating current power of a predetermined frequency and outputs the power to the charging unit 211 that executes processing to charge the battery 202. In other words, the power receiving unit 203 supplies power to a load in the RX 101. GP as described above is a power guaranteed to be output from the power receiving unit 203. Furthermore, by the power receiving unit 203 notifying the control unit 201 of the current received power, the received power at any discretionary time can be known by the control unit 201. Note that a configuration may be employed in which measuring the received power and notifying the control unit 201 is performed by a unit other than the power receiving unit 203.

The detecting unit 204 detects the RX 101 placed on the charging stand 103 on the basis of the WPC standard. The detecting unit 204, for example, detects at least the voltage value or the current value of the power receiving coil 205 at the time when the power receiving unit 203 receives a Digital Ping according to the WPC standard via the power receiving coil 205. The detecting unit 204, for example, determines that the RX 101 is placed on the charging stand 103 in the case in which the voltage value is less than a predetermined voltage threshold or the current value is greater than a predetermined current threshold.

The communication unit 206 performs control communication with the TX 102 based on the WPC standard such as that described above. The communication unit 206 acquires information transmitted from the TX 102 by demodulating electromagnetic waves input from the power receiving coil 205, and performs communication with the TX 102 by superimposing, on electromagnetic waves, information to be transmitted to the TX 102 by performing load modulation on the electromagnetic waves. In other words, communication performed by the communication unit 206 is performed by superimposition of information on electromagnetic waves transmitted from the power transmitting coil of the TX 102.

The notification unit 207 notifies the user of information via a discretionary method, such as a visual, auditory, or tactile method. The notification unit 207, for example, notifies the user of the charge state of the RX 101 or the state of the power transmission of the wireless power transmission system including the TX 102 and the RX 101 as illustrated in FIG. 1. The notification unit 207, for example, includes a liquid crystal display or LED, a speaker, a vibration generation circuit, or another type of notification device.

The operation unit 208 has a reception function of receiving operations for the RX 101 from the user. The operation unit 208, for example, includes a button or keyboard, an audio input device such as a microphone, a motion detection device such as an acceleration sensor or gyro sensor, or another type of input device. Note that the notification unit 207 and the operation unit 208 may be formed integrally as a single device such as a touch panel.

As described above, the memory 209 stores various information, such as identification information and device configuration information, a control program, and the like. Note that the memory 209 may store information obtained by a functional unit other than the control unit 201.

The timer 210, for example, measures time via a count up timer that measures the elapsed time from the time of activation or via a countdown timer that counts down from a set time.

The charging unit 211 charges the battery 202 via power supplied from the power receiving unit 203. Also, the charging unit 211 starts or stops charging of the battery 202 on the basis of control from the control unit 201 and adjusts the power used to charge the battery 202 on the basis of the charge state of the battery 202. When the power used by the charging unit 211 changes, the power supplied from the power receiving unit 203, i.e., the received power at the RX 101, changes according to this change. Herein, the charging unit 211 is a load in the RX 101.

The capability information obtaining unit 212 obtains capability information of the TX 102 from the TX 102 using the communication unit 206. The capability information includes information representing whether or not the TX 102 has the capability to calculate the parameter used in foreign object detection processing from three or more sets of a received power of the RX 101 and a transmitted power corresponding to the received power. Note that hereinafter, this capability is referred to as high accuracy foreign object detection processing capability.

The capability information obtaining unit 212 may be configured to operate via a processor that is not the control unit 201 or may be configured to be executed via a program that operates on the control unit 201. The capability information obtaining unit 212 achieves this function via execution of a program stored in the memory 209, for example.

The calibration request unit 213 uses the communication unit 206 to request the TX 102 to execute the calibration process. The calibration process may include processing to obtain the received power, obtain the transmitted power corresponding to the received power and calculate the power loss, and associate together and store the received power and the transmitted power or the power loss. Also, the calibration process may include processing to calculate the parameter for foreign object detection processing executed by the TX 102 from at least two sets of a received power and a transmitted power or a power loss. The calibration request unit 213, as with the capability information obtaining unit 212, may be configured to operate via a processor that is not the control unit 201 or may be configured to be executed via a program that operates on the control unit 201. Also, the calibration request unit 213 achieves this function via execution of a program stored in the memory 209, for example.

Figure 3:
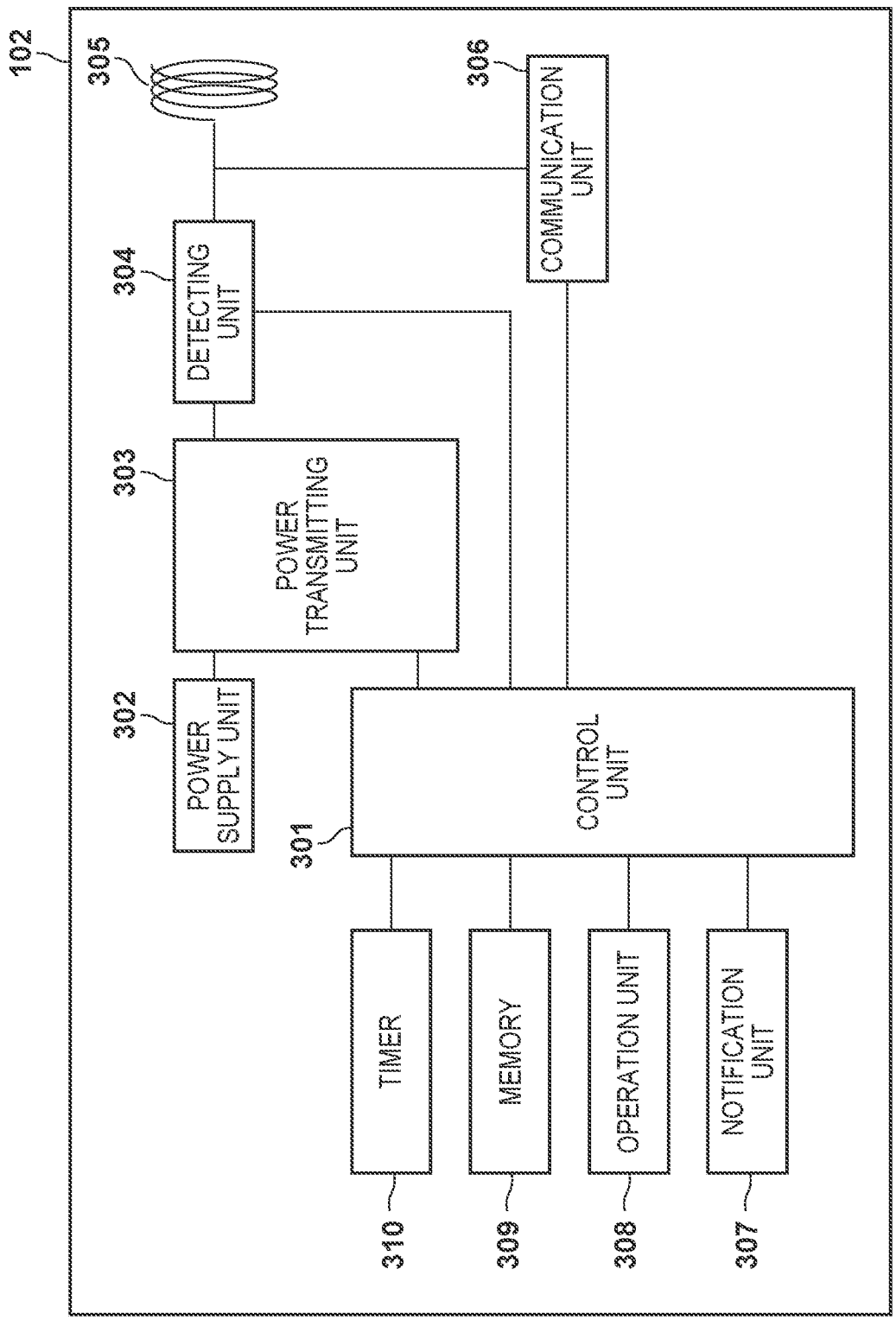
FIG. 3 is a diagram illustrating an example configuration of a power transmitting apparatus according to an embodiment.

FIG. 3 is a diagram illustrating the configuration of the TX 102 according to the present embodiment. The TX 102 includes, for example, a control unit 301, power supply unit 302, a power transmitting unit 303, a detecting unit 304, a power transmitting coil 305, a communication unit 306, a notification unit 307, an operation unit 308, memory 309, and a timer 310.

The control unit 301, for example, controls the entire TX 102 by executing a control program stored in the memory 309. In other words, the control unit 301 controls the functional units illustrated in FIG. 3. Also, the control unit 301 executes control relating to power transmission control of the TX 102. Furthermore, the control unit 301 may execute control for executing an application other than wireless power transmission. The control unit 301, for example, includes one or more processors, such as a CPU, an MPU, or the like. Note that the control unit 301 may include hardware dedicated to specific processing such as an application specific integrated circuit (ASIC) or an array circuit such as a FPGA compiled so as to execute predetermined processing. The control unit 301 stores information to be stored during the execution of various types of processing in the memory 309. Also, the control unit 301 is capable of measuring time using the timer 310.

The power supply unit 302 supplies the power to the entire TX 102 required for the control, power transmission, and communication of the TX 102 by the control unit 301. The power supply unit 302, for example, is a commercial power source or a battery. Power supplied from a commercial power source is stored in the battery.

The power transmitting unit 303 converts direct current or alternating current power input from the power supply unit 302 to alternating current frequency power in a frequency band used for wireless power transmission and generates electromagnetic waves for reception by the RX 101 by inputting the alternating current frequency power into the power transmitting coil 305. Note that the frequency of the alternating current power generated by the power transmitting unit 303 is approximately in the hundreds of kHz range (for example, from 110 kHz to 205 kHz). The power transmitting unit 303 inputs the alternating current frequency power to the power transmitting coil 305 to output, from the power transmitting coil 305, electromagnetic waves for performing power transmission to the RX 101 on the basis of instructions from the control unit 301. Also, the power transmitting unit 303 controls the intensity of the electromagnetic waves output by adjusting either one or both of the voltage (power transmission voltage) and the current (power transmission current) input to the power transmitting coil 305. If power transmission voltage or power transmission current is increased, the intensity of electromagnetic waves is increased, and if power transmission voltage or power transmission current is decreased, the intensity of electromagnetic waves is decreased. In addition, on the basis of an instruction from the control unit 301, the power transmitting unit 303 performs output control of the alternating current frequency power to start or stop power transmission from the power transmitting coil 305. Furthermore, by the power transmitting unit 303 notifying the control unit 301 of the current transmitted power, the transmitted power at any discretionary time can be known by the control unit 301. Note that a configuration may be employed in which measuring the transmitted power and notifying the control unit 301 is performed by a unit other than the power transmitting unit 303.

The detecting unit 304 detects whether an object is placed on the charging stand 103 on the basis of the WPC standard. Specifically, the detecting unit 304 detects whether or not an object is placed on an interface surface of the charging stand 103. The detecting unit 304, for example, detects at least the voltage value or the current value of the power transmitting coil 305 at the time when the power transmitting unit 303 transmits an Analog Ping according to the WPC standard via the power transmitting coil 305. Note that the detecting unit 304 may detect a change in impedance. Also, the detecting unit 304, for example, is capable of determining that an object is placed on the charging stand 103 in the case in which the voltage is less than a predetermined voltage value or the current value is greater than a predetermined current value. Note that whether the object is a power receiving apparatus or a different object is determined on the basis of whether or not there is a predetermined reply to the Digital Ping subsequently transmitted by the communication unit 306. In other words, in the case in which the TX 102 receives the predetermined reply, the object is determined to be a power receiving apparatus and, in the other case, the object is determined to be an object different from a power receiving apparatus.

The communication unit 306 performs control communication with the RX 101 based on the WPC standard such as that described above. The communication unit 306 performs communication by modulating the electromagnetic waves output from the power transmitting coil 305 and transmitting information to the RX 101. Also, the communication unit 306 obtains the information transmitted by the RX 101 by demodulating the electromagnetic waves output from the power transmitting coil 305 and modulated at the RX 101. In other words, communication performed by the communication unit 306 is performed by superimposition of information on electromagnetic waves transmitted from the power transmitting coil 305.

The notification unit 307 notifies the user of information via a discretionary method, such as a visual, auditory, or tactile method. The notification unit 307, for example, notifies the user of information representing the charge state of the TX 102 or the state of the power transmission of the wireless power transmission system including the TX 102 and the RX 101 as illustrated in FIG. 1. The notification unit 307, for example, includes a liquid crystal display or LED, a speaker, a vibration generation circuit, or another type of notification device.

The operation unit 308 has a reception function of receiving operations for the TX 102 from the user. The operation unit 308, for example, includes a button or keyboard, an audio input device such as a microphone, a motion detection device such as an acceleration sensor or gyro sensor, or another type of input device. Note that the notification unit 307 and the operation unit 308 may be formed integrally as a single device such as a touch panel.

The memory 309 stores various information, such as identification information and capability information, a control program, and the like. Also, the capability information includes information representing whether or not there a high accuracy foreign object detection processing capability is had. Note that the memory 309 may store information obtained by a functional unit other than the control unit 301.

The timer 310, for example, measures time via a count up timer that measures the elapsed time from the time of activation or via a countdown timer that counts down from a set time.

Processing Flow

Next, an example of the flow of the processing executed by the RX 101 and the TX 102 will be described.

Processing in the Power Receiving Apparatus

Figure 4A:
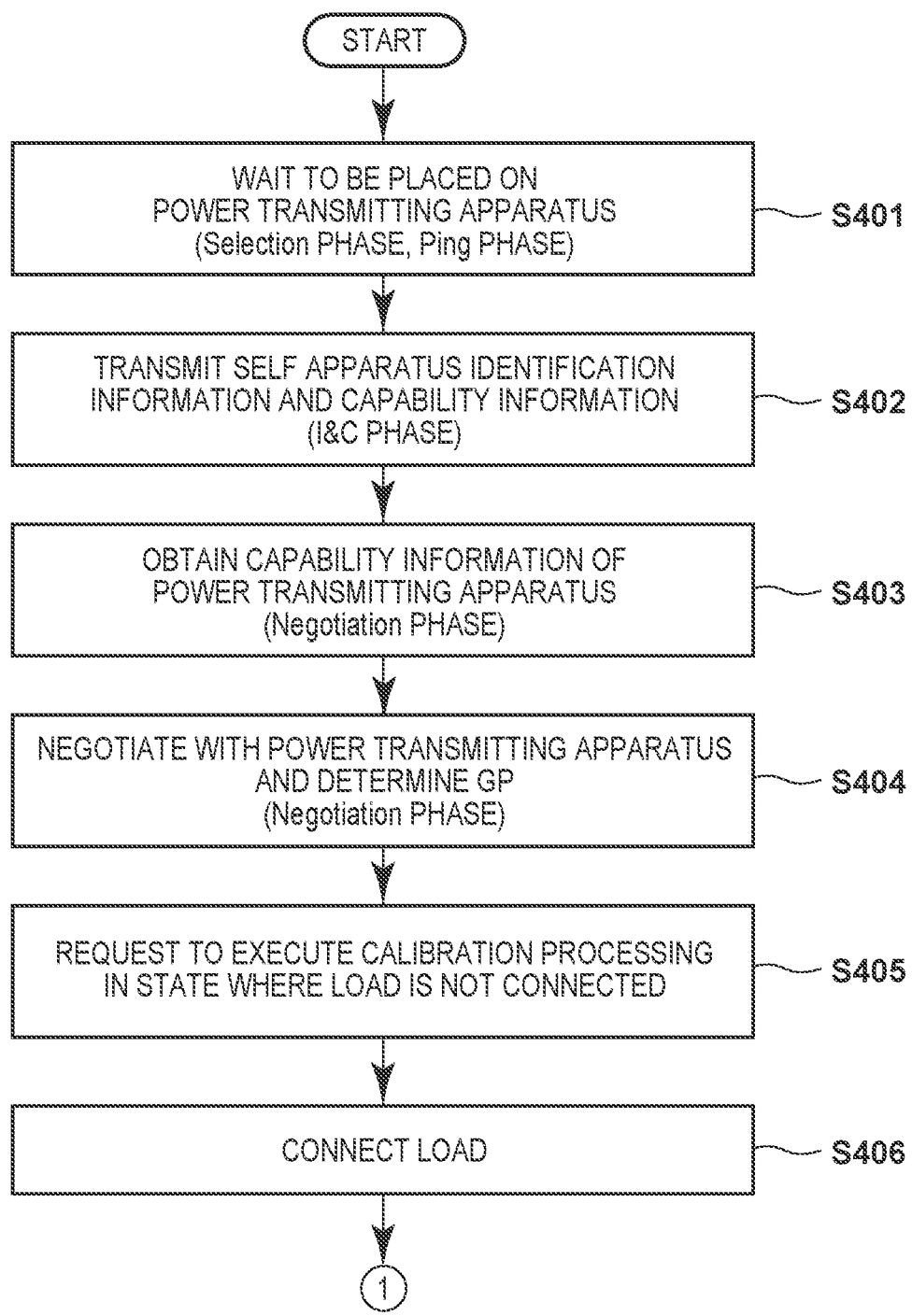
FIG. 4A is a flowchart illustrating an example of the flow of the processing of the power receiving apparatus according to an embodiment.
Figure 4B:
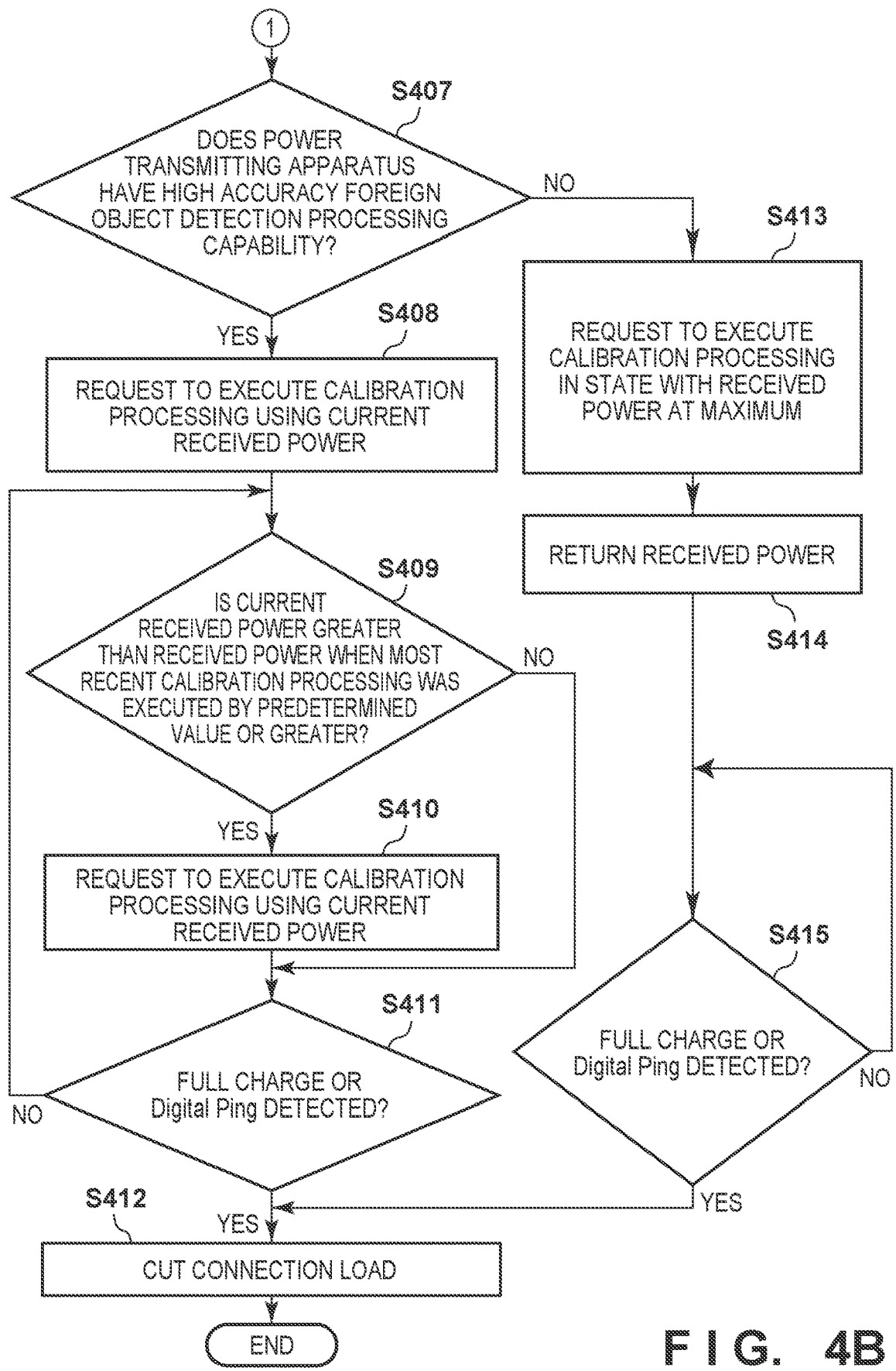
FIG. 4B is a flowchart illustrating an example of the flow of the processing of the power receiving apparatus according to an embodiment.

FIGS. 4A and 4B are flowcharts illustrating an example of the flow of the processing executed by the RX 101. The present processing can be implemented by the control unit 201 of the RX 101 executing a program read out from the memory 209, for example. The present processing also includes processing in the capability information obtaining unit 212 and the calibration request unit 213. Note that at least a part of the process of the present processing described below may be implemented by hardware. In the case of implementing processing by hardware, for example, using a predetermined compiler, the processing can be implemented by automatically generating a dedicated circuit that uses a gate array such as an FPGA from a program for implementing each type of processing. Also, the present processing may be executed in response to the power source of the RX 101 being turned on, in response to the RX 101 being activated by power being supplied from the battery 202 or the TX 102, or in response to the user of the RX 101 inputting a wireless charging application start instruction. Also, the present processing may be started by another trigger.

After the processing relating to transmitting and receiving power is started, the RX 101 executes processing defined in the WPC standard as a Selection phase and a Ping phase and waits for the RX 101 to be placed on the TX 102 (step S401). Next, the RX 101, for example, detects that the RX 101 is placed on the charging stand 103 of the TX 102 by detecting a Digital Ping from the TX 102. Then, when the RX 101 detects a Digital Ping, an SS packet including the received voltage value is transmitted to the TX 102.

When the RX 101 detects that the RX 101 is placed on the charging stand 103 of the TX 102, the RX 101 executes processing defined in the WPC standard as the I&C phase and transmits identification information and device configuration information (capability information) to the TX 102 via the communication unit 206 (step S402).

Figure 7A:
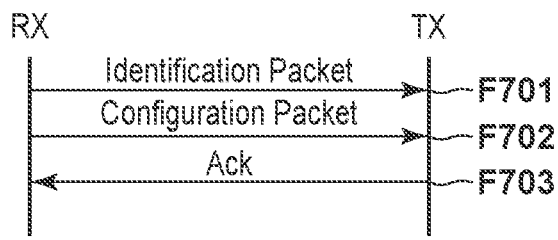
FIG. 7A is a diagram illustrating a communication sequence of an I&C phase.

FIG. 7A is a diagram illustrating the flow of communication in the I&C phase. In the I&C phase, the RX 101 transmits an Identification Packet (ID packet) to the TX 102 (F701). The ID Packet stores a Manufacturer Code and a Basic Device ID, which are identification information of the RX 101, as well as an information element that allows the version of the WPC standard corresponding to the RX 101 capability information to be identified.

The RX 101 also transmits a Configuration Packet to the TX 102 (F702). The Configuration Packet includes the following information as the capability information of the RX 101. The information includes the Maximum Power Value, which is the value for specifying the maximum power able to be supplied to the load by the RX 101, information representing whether or not a Negotiation function according to the WPC standard is had, and the like.

When the TX 102 receives these packets, the TX 102 transmits an ACK (F703) and ends the I&C phase. Note that the TX 102 may be notified of the identification information and the device configuration information (capability information) of the RX 101 by the RX 101 by a method other than communication in the I&C phase according to the WPC standard. Also, the identification information of the RX 101 may be a Wireless Power ID according to the WPC standard or may be another discretionary identification information that allows the individual RX 101 to be identified. As the capability information, information other than that described above may be included.

Next, returning to FIG. 4A, the RX 101 obtains the capability information of the TX 102 on which the RX 101 is placed via Negotiation phase communications (step S403). The capability information includes information representing whether or not there a high accuracy foreign object detection processing capability is had by the TX 102. Next, the RX 101 negotiates with the TX 102 and determines the GP (step S404).

Figure 7B:
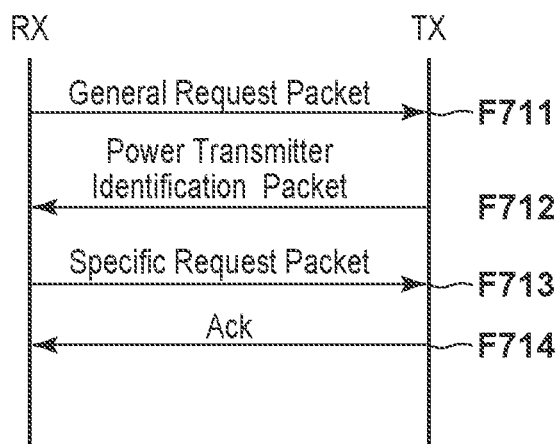
FIG. 7B is a diagram illustrating a communication sequence of a Negotiation phase.

FIG. 7B is a diagram illustrating an example of the flow of the Negotiation phase. RX 101 transmits a General Request Packet (F711). In the WPC standard, a General Request Packet is a packet for requesting various types of information from the communication partner apparatus. With this packet, the type of information requested can be specified. The RX 101 specifies Power Transmitter Identification as the type of information requested and obtains a power transmitter Identification Packet from the TX 102 (F712). This packet includes a major version and a minor version, which are pieces of information of the version of the WPC standard the TX 102 is compatible with and the Manufacturer Code of the TX 102. Here, in a case where the version of the WPC standard the TX 102 is compatible with is a predetermined version, the TX 102 can be determined to have a high accuracy foreign object detection processing capability. In this case, the Power Transmitter Identification corresponds to information representing whether or not the TX 102 has a high accuracy foreign object detection processing capability. Note that whether or not the TX 102 has a high accuracy foreign object detection processing capability can be determined using the Manufacturer Code in a similar manner.

Also, the information representing whether or not the TX 102 has a high accuracy foreign object detection processing capability may be obtained via a different packet. For example, the RX 101 may obtain information representing whether or not the TX 102 has a high accuracy foreign object detection processing capability via a Power Transmitter Capability Packet or Proprietary Packet according to the WPC standard. These packets can be obtained from the TX 102 by specifying the type via a General Request Packet with the RX 101.

The GP is determined using a Specific Request Packet and the corresponding reply as illustrated in FIG. 7B. First, the RX 101 transmits a Specific Request Packet to the TX 102 and notifies the TX 102 of the requested GP value (F713). The RX 101 determines the requested GP value on the basis of the power required by the RX 101, the capability information of the TX 102, and/or other information. An example of the GP value is 15 watts.

The TX 102 determines whether or not it can receive the request from the RX 101 on the basis of the transmission capability of the TX 102, and in a case where the TX 102 can receive the request, transmits an ACK (affirmative reply) and in a case where the TX 102 cannot receive the request, transmits a NAK (negative reply) to the RX 101. Note that FIG. 7B illustrates an example in which the TX 102 transmits an ACK (F714). In a case where the TX 102 transmits an ACK, the GP value is determined to be the same as the value requested by the RX 101 and is stored in the memory of both the RX 101 and the TX 102. On the other hand, in a case where the TX 102 transmits a NAK, the GP value corresponds to the default small value, for example 5 watts. The default value, for example, is stored in the memory of both the RX 101 and the TX 102 in advance. Note that the method of determining the GP described above is an example, and the GP may be determined by a different method.

Next, returning to FIG. 4A, after the GP is determined, the RX 101 requests the TX 102 to execute calibration processing in a state where a load (the battery 202) is not connected to the power receiving unit 203, i.e., the received power is at a minimum (step S405). Note that connecting the load to the power receiving unit 203 means that the power received at the power receiving unit 203 is supplied to the load, with this including cases where the load is directly connected to the power receiving unit 203 and cases where the load is indirectly connected to the power receiving unit 203.

Figure 7C:
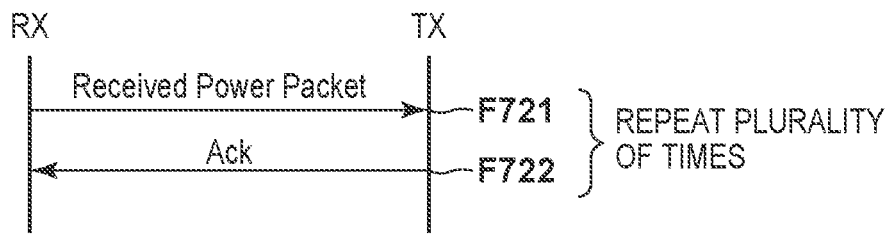
FIG. 7C is a diagram illustrating a communication sequence of a Calibration phase.

FIG. 7C is a diagram illustrating the flow of the Calibration phase. This calibration request is performed by transmitting a Received Power Packet via the communication unit 206 (F721). A Received Power Packet includes a received power value, which is the current received power, and information representing Mode=1, which is information representing that calibration processing of the first item is to be executed. TX 102 replies with an ACK after the calibration processing has been executed (F722). The calibration processing at the TX 102 will be described in detail below.

Returning to FIG. 4A, the RX 101 connects the load (the battery 202) to the power receiving unit 203 and starts charging the battery 202 via the charging unit 211 (step S406).

Then, the RX 101 determines whether or not the TX 102 has a high accuracy foreign object detection processing capability on the basis of the capability information of the TX 102 obtained in step S403 (step S407). In a case where the TX 102 has a high accuracy foreign object detection processing capability (yes in step S407), the RX 101 requests the TX 102 to execute calibration processing using the current received power (step S408). Note that this request is also performed via the Received Power Packet (F721) illustrated in FIG. 7C. In this case, the Received Power Packet represented by F721 includes the received power as well as information representing Mode=2, which is information representing that calibration processing of the second item is to be executed.

Note that even in cases where the RX 101 does not request calibration processing to be executed, the TX 102 is periodically notified of the current received power via the Received Power Packet represented by F721 in FIG. 7C. In a case where execution of calibration processing is not requested, the Received Power Packet includes the received power as well as information representing Mode=0. The periodic notifications are sent after the GP is determined in step S404.

Then, the RX 101 determines whether or not the current received power is greater than the received power of when the most recent calibration processing was executed by a predetermined value or greater (step S409). The predetermined value is stored in the memory 209 in advance and may be 0.5 watts or another value, for example. In a case where the determination of step S409 is affirmative (yes in step S409), the TX 102 is requested to execute calibration processing using the current received power (step S410). This request may also be performed via the Received Power Packet (F721) illustrated in FIG. 7C. In this case, the Received Power Packet represented by F721 may include the received power as well as information representing Mode=3, which is information representing that calibration processing of the third item is to be executed. Also, another value may be used if the mode is a value other than 0, 1, and 2. Furthermore, a request for calibration processing to be executed may be performed via a packet other than a Received Power Packet.

In a case where the determination of step S409 is not affirmative (no in step S409), the processing of step S410 is skipped.

Next, the RX 101 determines whether or not the battery 202 has a full charge or the detecting unit 204 detects a Digital Ping (step S411). In a case where the determination in either case is affirmative (yes in step S411), the connection of the load (the battery 202) with the power receiving unit 203 is cut, and power receiving ends (step S412). In the case of full charge, in the processing of step S412, the TX 102 is notified to stop transmitting power due to full charge being attained. The notification is performed via an End Power Transfer Packet according to the WPC standard, for example. On the other hand, in the case of no in step S411, the process returns to the processing of step S409.

With the processing loop of steps S409 to S411 described above, while charging, in a case where the received power for charging has increased by the predetermined value or greater, a request for the calibration processing of three or more items can be performed.

Also, in a case where the TX 102 is determined to not have a high accuracy foreign object detection processing capability (no in step S407), a request for calibration processing of the second item is performed with the received power at maximum (step S413). This request is also performed via the Received Power Packet (F721) in FIG. 7B. Note that in step S403, in a case where information representing whether or not the TX 102 has a high accuracy foreign object detection processing capability cannot be obtained, the RX 101 determines that the TX 102 does not have the capability. Examples of being unable to obtain information representing whether or not a high accuracy foreign object detection processing capability is had are given below. Examples include the version of the TX 102 represented by the obtained Power Transmitter Identification not being the predetermined version, the packet not being received within a predetermined amount of time, and the like.

Also, the RX 101 being in a state with the received power at maximum refers to the received power corresponding to the following power examples. Examples include the maximum power the RX 101 can supply to the load (the battery 202), the maximum power expected to be required at the load (the battery 202) in a time period from placed to charge completion, and power based on the GP.

After the processing of step S413, the RX 101 returns the received power to the power of step S406 (step S414). Then, the RX 101 determines whether or not the battery 202 has a full charge or the detecting unit 204 detects a Digital Ping (step S415). In a case where the determination in either case is affirmative (yes in step S415), the connection of the load (the battery 202) with the power receiving unit 203 is disconnectged, and power receiving ends (step S412). In the case of full charge, in the processing of step S412, the TX 102 is notified to stop transmitting power due to full charge being attained. The notification is performed via an End Power Transfer Packet according to the WPC standard, for example. In the case of no in step S415, the processing of step S415 is periodically repeated until a yes is returned in step S415.

To sum up the processing at the RX 101, when the RX 101 is placed on the TX 102, the RX 101 obtains information representing whether or not the TX 102 has a high accuracy foreign object detection processing capability. In a case where the TX 102 has this capability, a request for calibration processing in three or more states is performed. In a case where the TX 102 does not has this capability, a request for calibration processing in two states is performed.

Processing at Power Transmitting Apparatus

Next, an example of the flow of the processing executed by the TX 102 will be described using FIG. 5. The present processing can be implemented by the control unit 301 of the TX 102 executing a program read out from the memory 309, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing. Also, the present processing can be executed in response to the power source of the TX 102 being turned on, in response to the user of the TX 102 inputting a wireless charging application start instruction, or in response to the TX 102 connecting to a commercial power source and receiving power supply. Also, the present processing may be started by another trigger. Note that the TX 102 in this example has a high accuracy foreign object detection processing capability.

Regarding the power transmitting and receiving processing, the TX 102 first executes processing defined in the WPC standard as a Selection phase and a Ping phase and waits for the RX 101 to be placed (step S501). Specifically, the TX 102 repeats an Analog Ping according to the WPC standard, transmitting it intermittently, and detects whether or not an object is placed on the charging stand 103. If the TX 102 detects an object placed on the charging stand 103, the TX 102 transmits a Digital Ping. Also, if a predetermined reply (a Signal Strength Packet) to the Digital Ping is received, then the detected object is determined to be the RX 101 and the RX 101 is determined to be placed on the charging stand 103.

When the TX 102 detects the placement of the RX 101, the TX 102 executes the I&C phase communication described above via the communication unit 306 and obtains identification information and device configuration information (capability information) from the RX 101 (step S502).

Next, when the TX 102 receives a General Request Packet (F711 in FIG. 7B) from the RX 101, the TX 102 transmits its capability information (step S503). The capability information is transmitted using a Power Transmitter Identification Packet (F712 in FIG. 7B). The Power Transmitter Identification Packet includes information representing whether or not the TX 102 has a high accuracy foreign object detection processing capability.

Then, the TX 102 determines the GP on the basis of the request of the RX 101 (step S504). Specifically, as described in the processing of the power receiving apparatus, this is determined using the Specific Request Packet and the corresponding reply illustrated in FIG. 7B.

Thereafter, the TX 102 executes calibration processing on the basis of the request of the RX 101 (step S505). Next, the calibration processing will be described. The request for calibration processing received from the RX 101 includes information of the received power at the RX 101 and information (a numerical value representing the mode as described above) representing what number item of calibration processing is to be executed. When a request for calibration processing is received, the TX 102 obtains the power loss from the difference between the transmitted power at the power transmitting unit 303 at this time and the received power included in the request for calibration processing. Then, what number item of calibration processing is to be executed, the received power, and the power loss are associated together and stored in the memory 309. Note that instead of the power loss, the transmitted power may be associated together with the received power and stored, or the power loss and the transmitted power may both be associated with the received power and stored.

FIG. 8 is a diagram illustrating an example of the information stored in the memory 309. For example, the information in row 801 in FIG. 8 represents the result of calibration processing in a case where the request for calibration processing includes mode=1 and received power=0.4 watts. The power loss corresponds to 0.1 watt, which is the difference between the transmitted power of 0.5 watts first measured by the TX 102 after the calibration request is received and the received power. Thus, as represented in row 801, the three pieces of data, mode=1, the received power=0.4 watts, and the power loss=0.1 watts, are associated together and stored in the memory 309. Then, when the request for the calibration processing of the second item is received, the TX 102 measures the transmitted power, calculates the power loss, and stores the contents represented in row 802 in the memory 309. Thereafter, in response to a request for calibration processing, similar processing is executed and data is added.

Next, the TX 102 determines whether or not the calibration processing of the second item is complete (step S506). This is determined by determining whether or not the result of the calibration processing corresponding to mode=2 has been stored. In a case where the calibration processing of the second item has not been executed (no in step S506), the process returns to step S505 and the calibration processing of the second item is executed on the basis of the request of the RX 101.

In a case where the calibration processing of the second item has been executed (yes in step S506), the TX 102 starts foreign object detection processing (step S507). The foreign object detection processing at the TX 102 is executed as follows. First, the TX 102 periodically obtains information of the current received power from the RX 101. Then, the TX 102 obtains, via linear interpolation, the expected value of the power loss for the obtained received power using the results of the calibration processing of the first item and the second item as represented in FIG. 8. In the linear interpolation, Formulas 5 and 6 described above can be used.

After the received power is obtained, the TX 102 calculates the power loss from the difference between the transmitted power measured first and the obtained received power. Then, the difference between the calculated power loss and the expected value is compared with a threshold. In a case where the comparison result is greater than a predetermined value, it is determined that there is a power loss caused by a foreign object such as a metal piece and that there is a foreign object in the power transmitting range. Next, the TX 102 restricts the transmission of power via the control unit 201. Specifically, the control unit 201 controls the power transmitting unit 303 to stop transmitting power or to lower the transmitted power. Also, the control unit 201 may notify the RX 101 via the communication unit 306 of the existence of a foreign object. The control unit 201 may also notify of the transmitted power restriction.

Next, an example in which the results of calibration processing of the second item correspond to the contents represented in rows 801 and 802 in FIG. 8 will be described in detail. For example, in a case where the value of the current received power (RP) is 0.7 watts, the numerical values of row 801 (RP1=0.4 watts, PL1=0.1 watts) and row 802 (RP2=1.0 watts, PL2=0.3 watts) are entered into Formulas 5 and 6 described above. In this case, the expected value PL of the power loss is as follows.

$$PL=(0.3-0.1)/(1.0-0.4)*(0.7-0.4)+0.1=0.2$$

After the received power is obtained, the TX 102 calculates the power loss from the difference between the transmitted power measured first and the current received power (RP=0.7 watts). Then, in a case where the value of the power loss and the expected value (PL) of 0.2 watts are equal to or greater than a predetermined value, it is determined that there is power loss due to a foreign object and that a foreign object is in the power transmitting range. The predetermined value may be an absolute value such as 1 watt or may be a relative value such as 50 percent of the expected value, for example. The information relating to the predetermined value is stored in the memory 309. Also, the predetermined value may change step by step depending on the received power or the expected value of the power loss.

Also, the TX 102 transmits power to the RX 101 (step S508). While power is being transmitted, foreign object detection processing is executed.

The TX 102 receives a request for calibration processing during power transmission. Then, the TX 102 executes calibration processing of the third item on the basis of the request (step S509). In a case where there are three or more results for calibration processing, the parameters of Formulas 5 and 6 described above are changed as follows. For (RP1, PL1) and (RP2, PL2), the results of the calibration processing of two items close to the current received power (RP) are used. For example, it is assumed that row 803 in FIG. 8 is obtained via the processing of step S509 and the value of the current received power (RP) corresponds to 1.6 watts. In this case, for (RP1, PL1) and (RP2, PL2), the data (1.0 watt, 0.3 watts) of row 802 and the data (1.5 watts, 0.4 watts) of row 803 are selected. From the data, an expected value (PL) of the power loss of 0.42 watts is obtained via Formulas 5 and 6. The subsequent processing is similar to the foreign object detection processing described above.

TX 102 determines whether or not the RX 101 is at full charge or whether or not a foreign object has been detected (step S510). Whether or not the RX 101 is at full charge is determined on the basis of whether or not an End Power Transfer Packet has been received from the RX 101 via the communication unit 306. In a case where the communication unit 306 has received an End Power Transfer Packet, it is determined that the RX 101 is at full charge. Also, the foreign object detection determination is performed via the foreign object detection processing described above.

Next, in a case where the RX 101 is determined to be at full charge or in a case where a foreign object has been detected (yes in step S510), the TX 102 stops transmitting power (step S511). Note that in a case where a foreign object is detected while power is being transmitted, after power transmission is stopped, the TX 102 may return to transmitting a Digital Ping in the Ping phase of step S501. Also, in a case where the RX 101 is not determined to be at full charge or in a case where a foreign object is not detected (no in step S510), the TX 102 returns to the processing of step S509.

System Operation

The operation sequences of the RX 101 and the TX 102 described using FIGS. 4A, 4B, and 5 will now be described using FIG. 6. The TX 102 has a high accuracy foreign object detection processing capability. In the example in FIG. 6, the flow of time is from up to down. As the initial state, the RX 101 is not placed on the TX 102 or the load (the battery 202) of the RX 101 is not connected to the power receiving unit 203.

First, the TX 102 transmits an Analog Ping and waits for the object to be placed on the charging stand 103 (F601, step S501). When the RX 101 is placed (F602), a change in the voltage or current of the Analog Ping occurs (F603). The TX 102 detects the placement of the object via this change (F604). When the placement of the object is detected, the TX 102 transmits a Digital Ping (F605). The RX 101 detects that it has been placed on the TX 102 by receiving the Digital Ping (F606). Also, the TX 102 detects that the object placed on the charging stand 103 is the RX 101 via a reply to the Digital Ping.

Next, via communication in the I&C phase, identification information and device configuration information (capability information) is transmitted from the RX 101 to the TX 102 (F607, step S402, step S502). Then, the TX 102 transmits it's capability information to the RX 101 according to a request from the RX 101. The capability information includes information representing whether or not there a high accuracy foreign object detection processing capability is had by the TX 102 (F608, step S403, step S503).

Next, the GP is determined by negotiation between the RX 101 and the TX 102 (F609, step S404, step S504). At this time, in the RX 101, the load (the battery 202) is in a state of not being connected to the power receiving unit 203 (F610). In this state, the RX 101 requests for the TX 102 to execute calibration processing (F611, step S405). The TX 102 executes calibration processing of the first item on the basis of the request (F612, step S505).

Next, the RX 101 connects the load (the battery 202) to the power receiving unit 203 (F613, step S406). Because the TX 102 has a high accuracy foreign object detection processing capability, the RX 101 requests for calibration processing of the second item to be executed with the received power directly after being connected to the load (the battery 202) (F614, step S408). The TX 102 executes calibration processing of the second item on the basis of the request (F615).

At this time, because calibration processing of the second item has been executed, the TX 102 start foreign object detection processing (F616, step S507). Next, with the RX 101 and the TX 102, foreign object detection processing is executed and power is transmitted to the RX 101 (F617).

In a case where the received power of the RX 101 is greater than that at the time of the calibration processing of the second item by a predetermined value or greater (F618, step S409), the RX 101 requests for calibration processing of the third item to be executed (F619, step S410). The TX 102 executes calibration processing of the third item on the basis of the request (F620).

In the related art, calibration processing of the second item is executed after the load (the battery 202) is connected to the power receiving unit 203 with the received power raised to maximum. However, in the present embodiment, the calibration processing of the second item is executed with the received power directly after the load (the battery 202) is connected to the power receiving unit 203. In other words, with the present embodiment, the processing for raising the received power to maximum can be omitted, the calibration processing of the second item can be completed in a shorter amount of time, and foreign object detection processing can be started. Because the amount of time from placement of the RX 101 on the charging stand 103 to the start of foreign object detection processing is shortened, the likelihood of a foreign object being placed on the charging stand 103 before the start of foreign object detection processing causing the subsequent foreign object detection to be unable to be performed properly can be decreased.

However, in a case where the received power is increased, in foreign object detection processing using the result of the calibration processing of the second item, the accuracy is reduced. Thus, in the present embodiment, calibration of three or more items is performed. By using the results of the calibration processing of three or more items, foreign object detection can be performed at a higher accuracy.

Note that as illustrated in FIG. 4B, in a case where the TX 102 does not possess a high accuracy foreign object detection processing capability (no in step S407), known calibration processing with the received power set to maximum is executed (step S413). In this manner, regarding the RX 101, backward compatibility with the TX 102 that does not possess a high accuracy foreign object detection processing capability is ensured.

Figure 5:
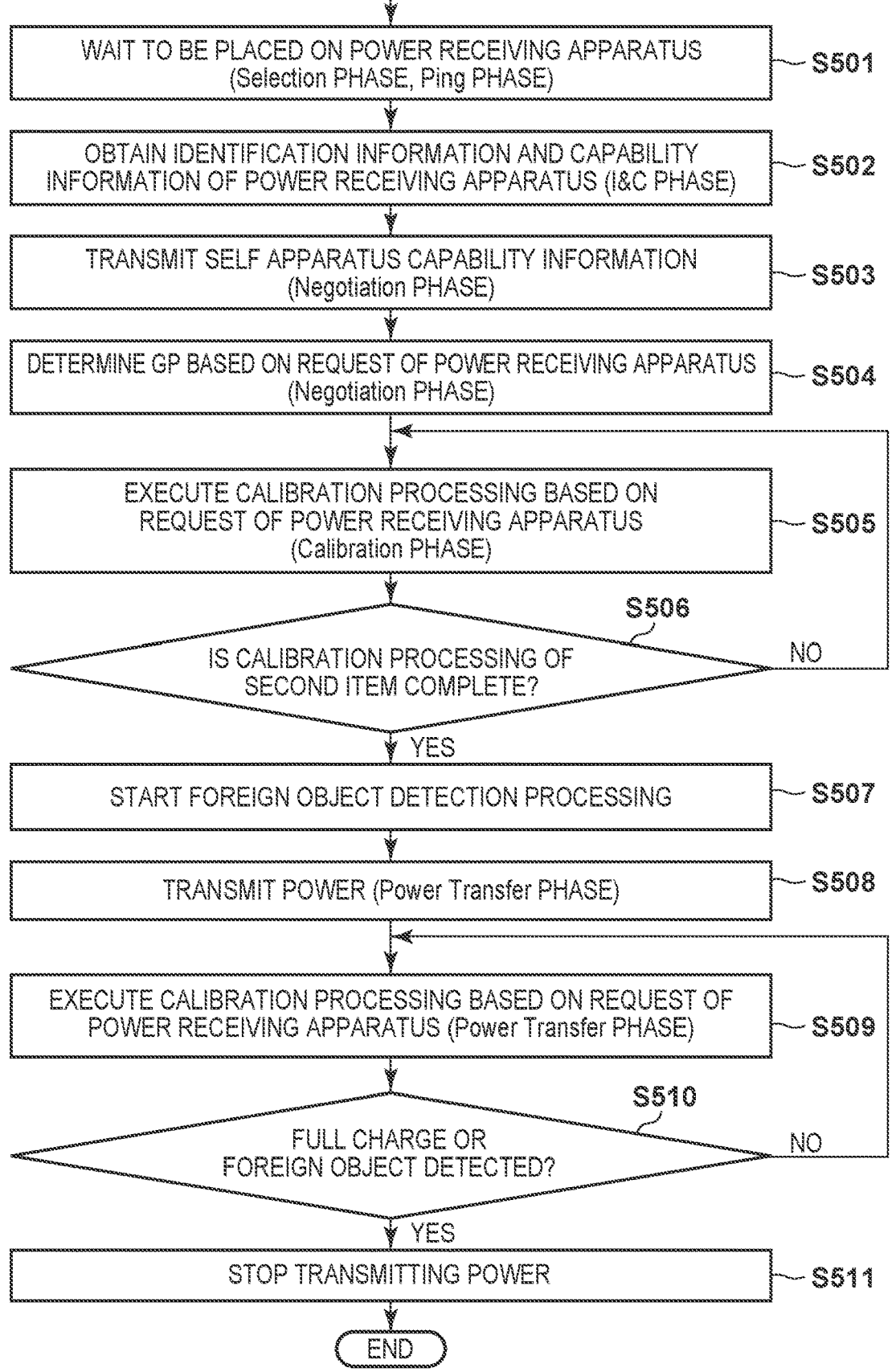
FIG. 5 is a flowchart illustrating an example of the flow of the processing of the power transmitting apparatus according to an embodiment.
Figure 6:
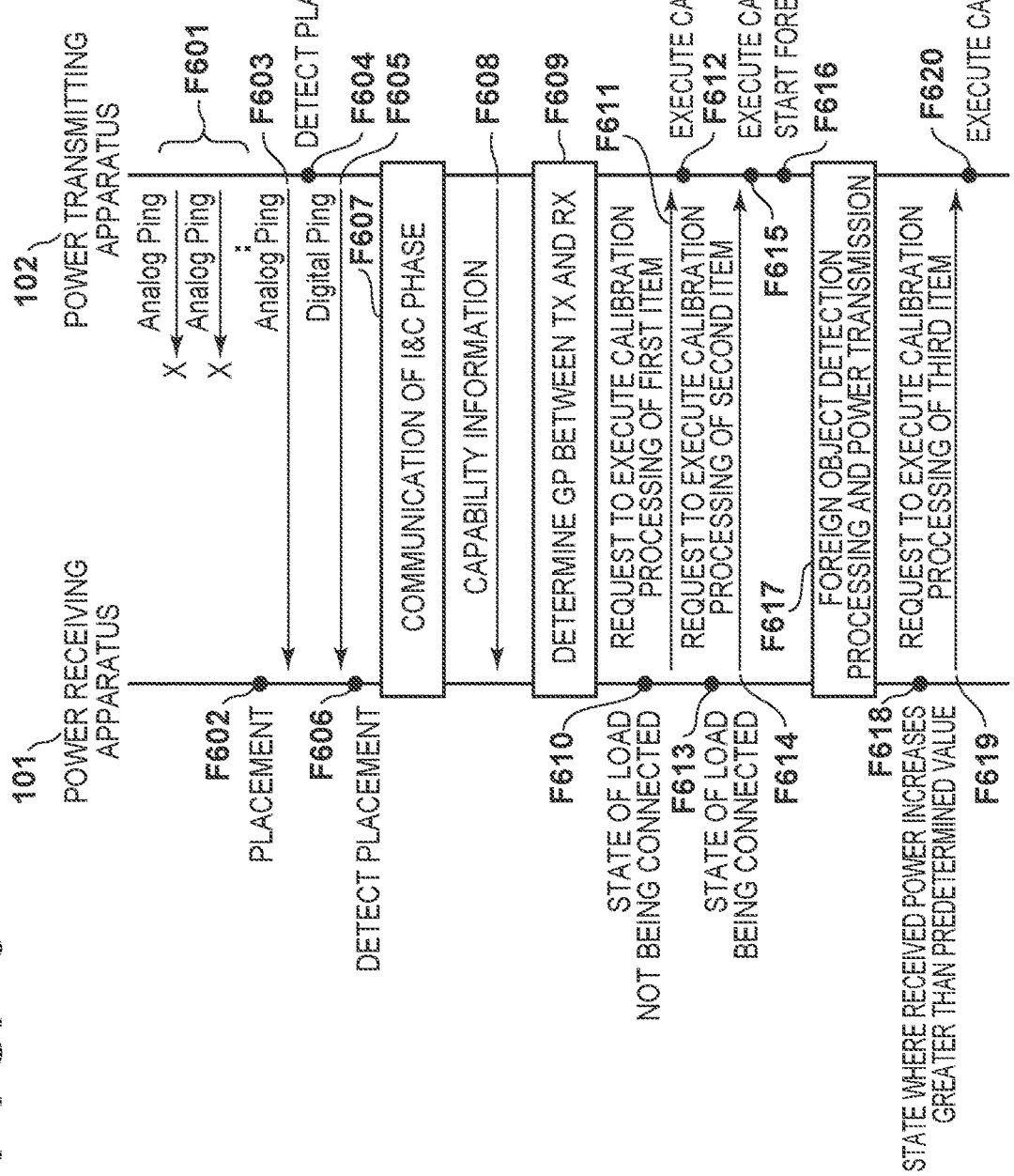
FIG. 6 is a diagram illustrating an example of the flow of the processing executed by a wireless charging system.

Note that at least a part of the processing illustrated in the flowcharts of FIGS. 4A, 4B, and 5 may be implemented by hardware. In the case of implementing processing by hardware, for example, using a predetermined compiler, the processing can be implemented by automatically generating a dedicated circuit on an FPGA from a program for implementing the processing. In addition, similarly to an FPGA, a gate array circuit may be formed and implemented as hardware.

According to the above embodiments, a power transmitting apparatus that calculates a parameter for processing to detect an object different from a power receiving apparatus using three or more sets of a transmitted power and a received power can be efficiently caused to obtain information representing a received power.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A power receiving apparatus comprising:
one or more memories storing instructions; and
one or more processors operable to execute the instructions to:
wirelessly receive power from a power transmitting apparatus that executes detection processing to detect foreign object when power is wirelessly transmitted;
obtain information to determine whether or not the power transmission device has a specific capability for the detection processing;
transmit, in a case where the power transmitting apparatus has the specific capability, first information representing first received power, second information representing second received power that is larger than the first received power after transmitting the first information, and third information representing third received power that is larger than the second received power after transmitting the second information, wherein the first received power, the second received power and the third received power are used in calculating one or more parameters used in the detection processing to determine a power loss, and wherein the third received power is less than or equal to a maximum power specified by the power receiving apparatus; and in a case where the power transmitting apparatus does not have the specific capability, transmit the first information representing the first received power and fourth information representing a power received at the specified maximum power after transmitting the first information, wherein the first received power and the power received at the specified maximum power are used in calculating the one or more parameters used in the detection processing.

2. The power receiving apparatus according to claim 1, wherein the information to determine whether or not the power transmitting apparatus has the specific capability is information based on version information of Wireless Power Consortium standard which the power transmitting apparatus is compatible with.

3. The power receiving apparatus according to claim 1, wherein the information to determine whether or not the power transmitting apparatus has the specific capability is information included in any one of a Power Transmitter Identification Packet, a Power Transmitter Capability Packet, or a Proprietary Packet as specified in Wireless Power Consortium standard which the power transmitting apparatus is compatible with.

4. The power receiving apparatus according to claim 1, wherein the first received power is a received power which is not supplied to a load of the power receiving apparatus.

5. The power receiving apparatus according to claim 4, wherein the load is a battery.

6. The power receiving apparatus according to claim 1, wherein the second received power is a received power after supply of power to a load of the power receiving apparatus is started.

7. The power receiving apparatus according to claim 1, wherein the specified maximum power is a maximum power that can be supplied to a load.

8. The power receiving apparatus according to claim 1, wherein the specified maximum power is a power determined through negotiation with the power transmitting apparatus.

9. The power receiving apparatus according to claim 1, wherein the specific capability is a capability to calculate the parameter based on three or more sets of a received power of the power receiving apparatus and a transmitted power of the power transmitting apparatus corresponding to the received power.

10. A method executed by a power receiving apparatus comprising:

wirelessly receiving power from a power transmitting apparatus that executes detection processing to detect foreign object when power is wirelessly transmitted;

obtaining information to determine whether or not the power transmission device has a specific capability for the detection processing;

transmitting, in a case where the power transmitting apparatus has the specific capability, first information representing first received power, second information representing second received power that is larger than the first received power after transmitting the first information, and third information representing third received power that is larger than the second received power after transmitting the second information, wherein the first received power, the second received power and the third received power are used in calculating one or more parameters used in the detection processing to determine a power loss, and wherein the third received power is less than or equal to a maximum power specified by the power receiving apparatus; and transmitting, in a case where the power transmitting apparatus does not have the specific capability, the first information representing the first received power, and fourth information representing a power received at the specified maximum power after transmitting the first information, wherein the first received power and the power received at the specified maximum power are used in calculating the one or more parameters used in the detection processing.

* * * * *